UNITED STATES PATENT OFFICE.

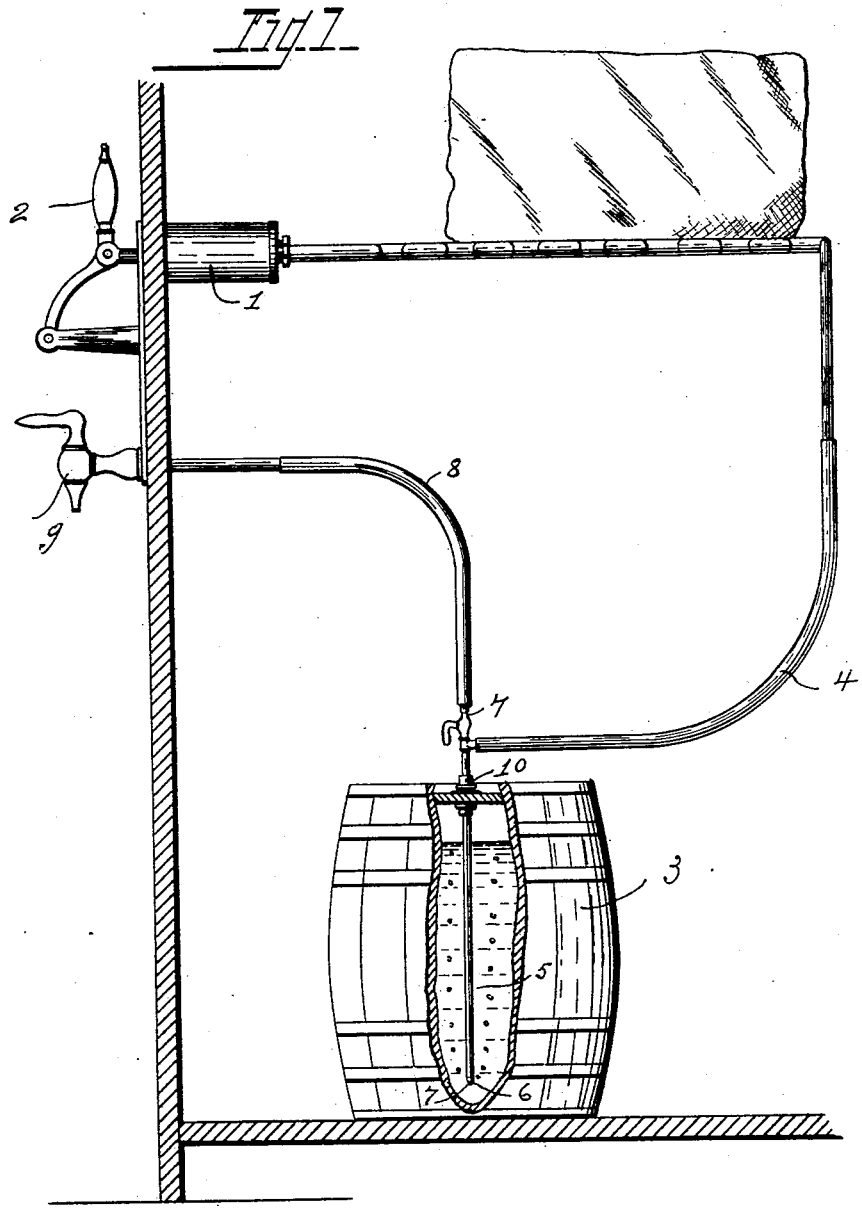

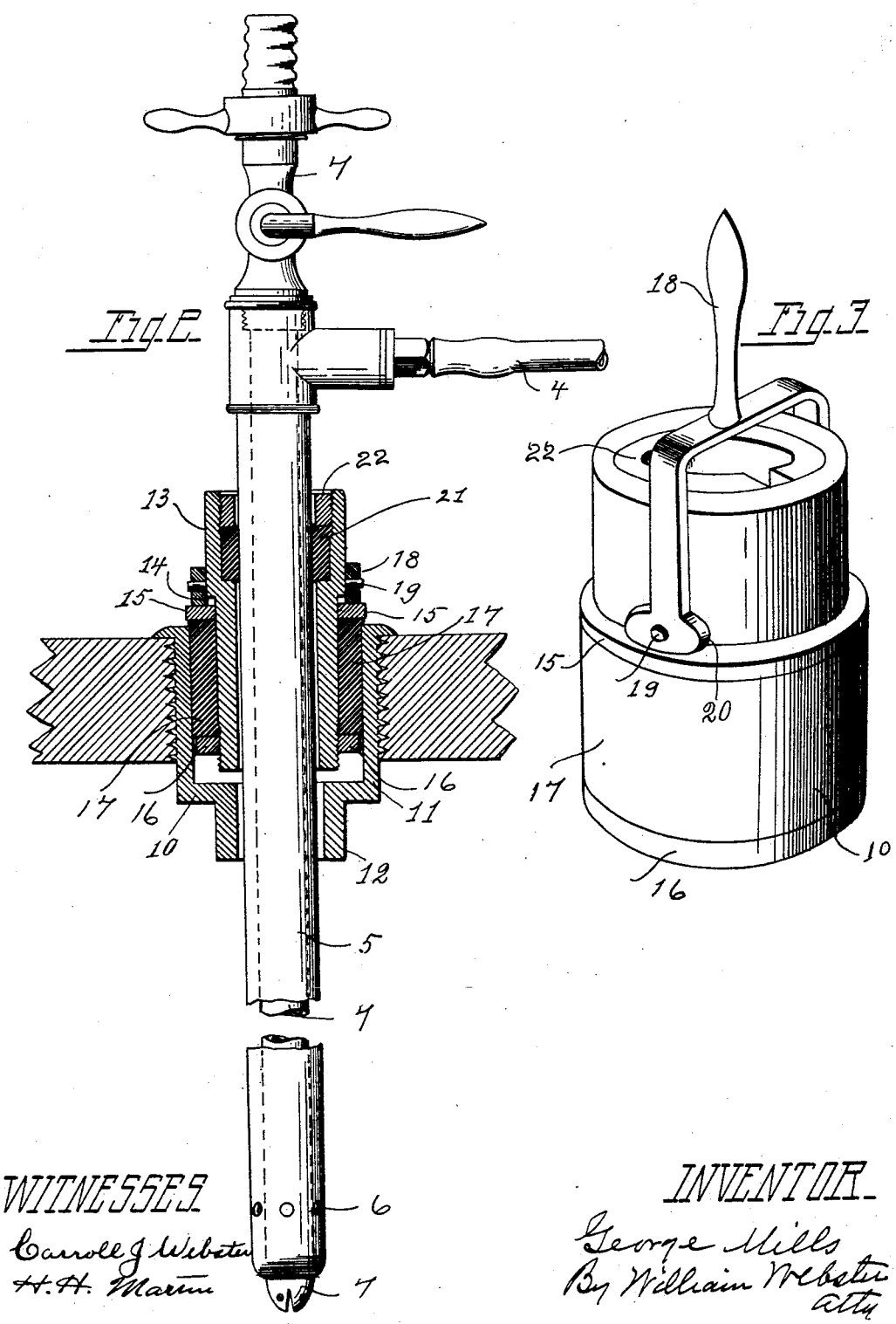

GEORGE MILLS, OF RIGA, MICHIGAN.

MEANS FOR AERATING AND REFRIGERATING LIQUIDS.

SPECIFICATION forming part of Letters Patent No. 587,987, dated August 10, 1897.

Application filed January 23, 1897. Serial No. 620,308. (No model.)

*To all whom it may concern:*

Be it known that I, GEORGE MILLS, of Riga, county of Lenawee, and State of Michigan, have invented certain new and useful Improvements in Means for Aerating and Refrigerating Liquids; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to means for aerating and refrigerating liquids, and has particular reference to a pressure apparatus for forcing beer or other liquids from a supply-cock to the faucet by means of a coupling-body of novel and convenient construction, and an air and draw-off pipe leading into the cock to a point near the bottom thereof in connection with the coupling-body.

In the drawings, Figure 1 is a sectional elevation through a portion of a refrigerator, illustrating the connections between the point of compression, the keg, and the faucet, respectively, arranged in accordance with my invention. Fig. 2 is a side elevation and sectional elevation of the air-inlet and beer-exit pipes and the coupling employed for securing the tubes within the keg, respectively. Fig. 3 is a perspective view of the coupling.

1 designates an air-pump, which is illustrated in the drawings as an ordinary hand-pump operated by the lever 2. Connected with the pump and with the keg 3, through the medium of the tube 4, is an air-pipe 5, located within the refrigerator and preferably coiled at a point contiguous to the cooling medium, whereby the pipe and the air passing therethrough are cooled. Tube 4 extends to a point at or near the bottom of the keg 3, at which point it is provided with orifices 6 for the exit of the air forced therethrough. The orifices 6, being located at a point near the bottom of the keg, cause the air passing therethrough to enter the beer and ascend through the beer. The air being cold has a direct action upon the beer, and consequently refrigerates as well as aerates the beer.

7 designates the beer-tube, which extends downwardly to a point adjacent to the lower end of the air-tube 4, the upper end being connected to a pipe or hose 8, connected with a draw-off cock 9 in the well-known or any preferred manner.

Heretofore it has been usual to employ an air-pipe leading into the keg near the top, with the result that the air forms a pressure upon the top of the beer and does not impregnate the same.

In order to secure the tubes 4 and 7 into the keg, I provide a bushing 10, permanently secured into an orifice in the top of the keg, the bushing being of two diameters, a larger diameter 11 and a smaller diameter 12. The smaller diameter is of a size to receive the cork after the keg is filled, which is driven out by the consumer by the insertion of the tubes.

13 designates the coupling-body, which is provided with a shoulder 14, against which normally rests an annular ring 15, which has a free movement upon the coupling-body 13.

16 designates a like ring screw-threaded upon the coupling-body at the lower end thereof, between which and the loose ring 15 is interposed a rubber gasket 17, the gasket and the lower ring 16 being of a size to normally enter the larger diameter 11 of the bushing, the gasket 17 being expanded against the interior of the bushing by the downward movement of the movable ring 15, due to the rocking of a hand-lever 18, pivoted upon pins 19, secured to or integral with the coupling-section 13, the lever being provided with cam-faces 20, which bear against the ring 15 and by which the ring is depressed. By this means there is provided a tight joint between the exterior of the coupling-section 13 and the interior of the bushing, whereby leakage at this point is prevented.

The interior diameter of the coupling-section 13 is enlarged at its upper end of a size to receive the rubber gasket 21 and the annular ring 22, which screws within the coupling-section and bears against the gasket 21, by which the gasket is expanded. The gasket is normally expanded to a point so that its inner diameter is slightly less than the exterior diameter of the tube 4, whereby when the tube is inserted through the coupling-section the gasket forms a packing to provide a tight joint between the exterior of the tube and the interior of the coupling-section.

The operation of tapping a keg is as follows: When received from the brewery, the larger diameter of the interior of the bushing is empty, the smaller diameter having a cork secured therein, which is provided at the brewery. The coupling-section 13 is inserted into the larger diameter, and the lever 18 is rocked, expanding the gasket 17 and providing a tight joint between the exterior of the coupling-section and the interior of the gasket. The tubes 4 and 7 are now inserted through the interior of the coupling-section, which forces the cork into the keg. By this means a quick connection can be made with a keg with a minimum leakage of the contents thereof.

What I claim is—

1. In a device of the class described, a coupling-body, a ring screwed thereon, a loose ring movable thereon, a packing-ring arranged between the rings, a lever pivotally secured to the body, having a cam projection upon its lower end, whereby the loose ring is moved longitudinally of the coupling-body.

2. In a device of the class described, a keg, an air and a draw-off pipe leading into the keg to a point near the bottom thereof, a bushing secured into the keg, a coupling arranged in the bushing, comprising a body, a ring screwed thereon, a packing surrounding the body, and a ring bearing upon the upper edge of the packing, a lever having cam-faced ends pivoted centrally thereof to the body above the upper ring.

In testimony that I claim the foregoing as my own I hereby affix my signature in presence of two witnesses.

GEORGE MILLS.

Witnesses:
GUSTAV KROENCKE,
ALFRED KROENCKE.